United States Patent [19]

Hayes et al.

[11] 4,010,877
[45] Mar. 8, 1977

[54] WORK FIXTURE AND FOLDING METHOD

[75] Inventors: Robert L. Hayes; Joseph C. Gould, both of Honea Path, S.C.

[73] Assignee: Parke, Davis & Company, Detroit, Mich.

[22] Filed: Apr. 22, 1976

[21] Appl. No.: 679,110

Related U.S. Application Data

[62] Division of Ser. No. 585,271, June 9, 1975.

[52] U.S. Cl. .................................................. 223/37
[51] Int. Cl.² ........................................ A41H 33/00
[58] Field of Search ............. 223/1, 37, 39–43, 223/38; 270/61 B, 66, 67

[56] References Cited

UNITED STATES PATENTS

| 620,251 | 2/1899 | Pratt | 223/39 X |
| 1,101,522 | 6/1914 | Chipman | 223/37 |
| 1,793,856 | 2/1931 | Johnson | 223/42 |

*Primary Examiner*—G. V. Larkin
*Attorney, Agent, or Firm*—David B. Ehrlinger; George M. Richards; Stephen Raines

[57] ABSTRACT

A work fixture is provided for testing leak-proof wearing apparel such as rubber gloves. The fixture comprises a leak-proof pneumatic clamp for mounting each article of apparel. The fixture also comprises means for folding the article while removing it from the fixture.

4 Claims, 9 Drawing Figures

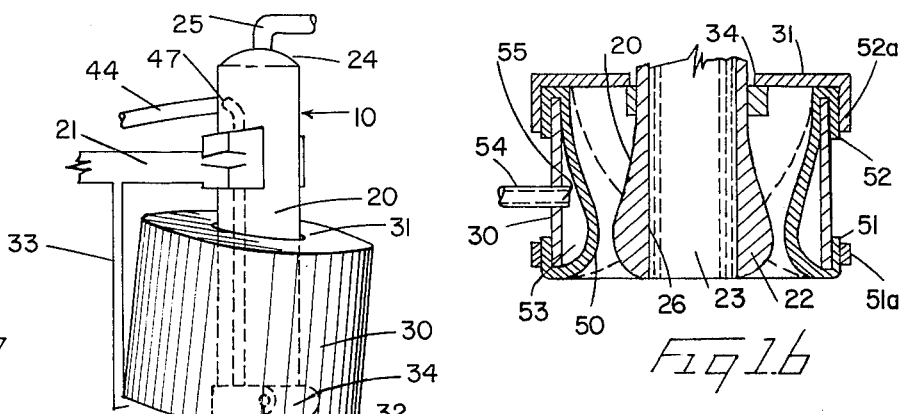
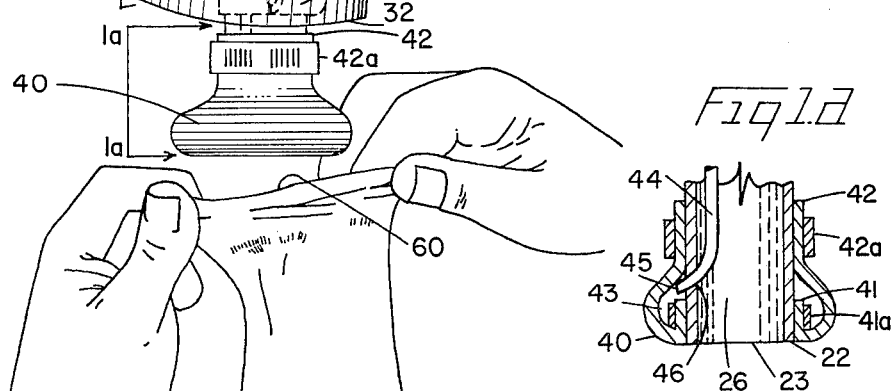
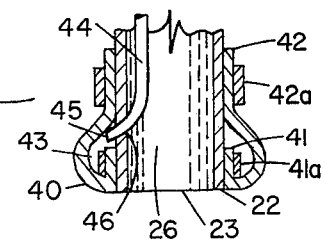
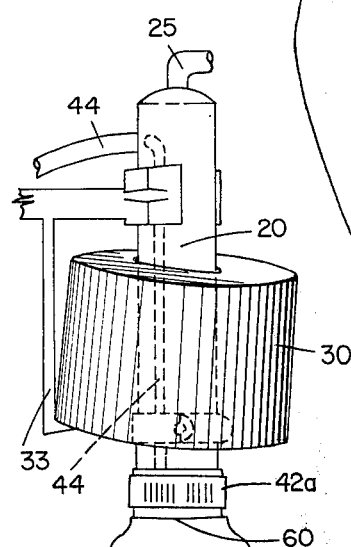
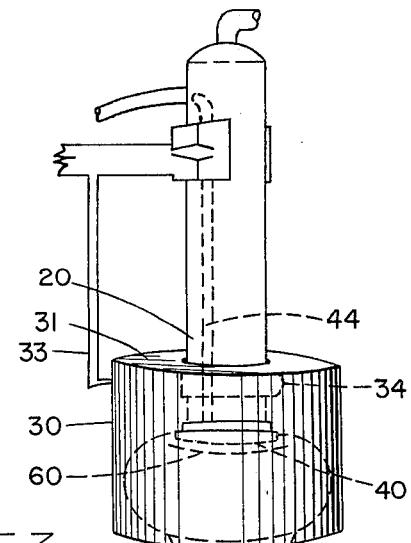

WORK FIXTURE AND FOLDING METHOD

This is a division of application Ser. No. 585,271, filed June 9, 1975.

SUMMARY AND DETAILED DESCRIPTION

The present invention relates to work fixture means for testing and folding leak-proof wearing apparel such as rubber gloves.

Prior art methods for testing leak-proof wearing apparel such as rubber gloves have been unduly cumbersome requiring testing under water (e.g., see U.S. Pat. No. 2,054,204), or elaborate mounting apparatus, etc., or have tended to damage the article by overstretching.

It is an object of the present invention therefore to provide simple fixture means for testing leak-proof wearing apparel.

It is also an object of the invention to provide means for testing leak-proof wearing apparel without adversely affecting the quality thereof.

It is a further object of the invention to provide means for folding or cuffing leak-proof wearing apparel.

These and other objects and advantages of the invention are seen in the accompanying drawing in which:

FIGS. 1–3 are side elevational views of a work fixture for mounting an item of wearing apparel;

FIG. 1a is a sectional fragmentary view of a work fixture taken on line 1a—1a;

FIG. 1b is a similar sectional fragmentary view of a work fixture; and

Figure 4:
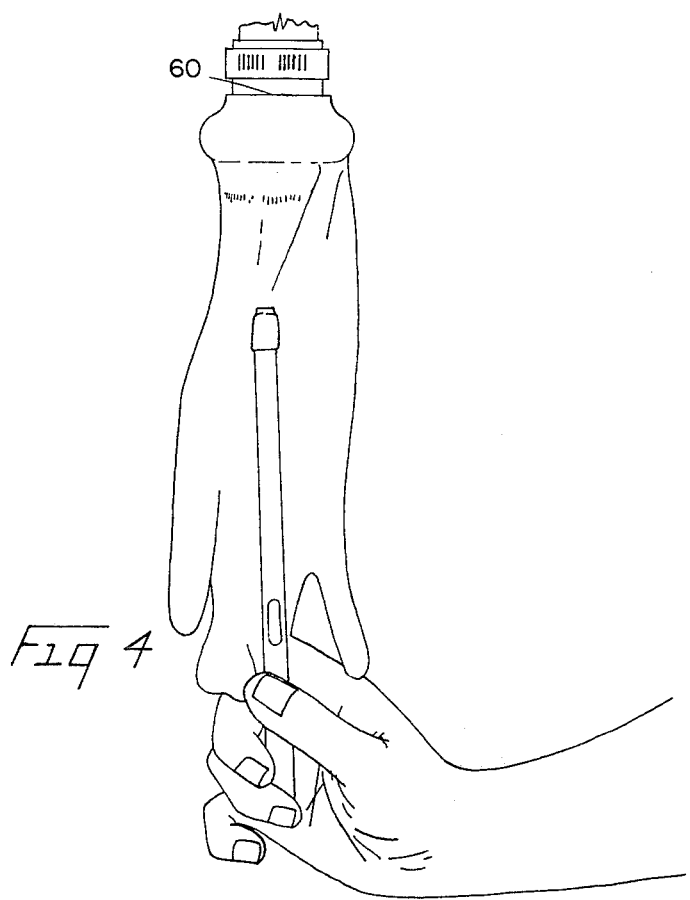
FIGS. 4–7 are side elevational views of a work fixture showing successive steps in the operation of folding a cuff on an article of wearing apparel.

The invention is applicable broadly to leak-proof wearing apparel such as elastomeric articles, surgical and prophylactic goods, and the like. However, for convenience of illustration, the following description will concern specifically a preferred embodiment which is the testing and handling of rubber gloves or surgeons gloves. This embodiment is merely exemplary. It will be realized that the same can be modified within the scope of the invention to accommodate other similar types of articles.

Referring now to the drawing, FIG. 1 shows a work fixture 10 having a cylindrical air chamber or sleeve 20 held vertically by a stationary support 21. The lower end 22 of the sleeve 20 defines an opening 23 which is circular in cross-section and sufficiently large to afford access for reception of a rubber glove upwardly into the sleeve. The opening and the bore through the sleeve, for example, may conveniently be about 1¾ inches in diameter. The upper end 24 of the sleeve 20 communicates through line 25 with a source of low pressure air and a leak tester device (not shown). The inside surface 26 of the sleeve 20 is generally smooth to facilitate sliding contact with a glove for purposes described below.

Surrounding the sleeve 20 is a coaxial collar 30 which, as described below, serves to clampingly confine an inflatable member associated with the collar and sleeve. The collar is cylindrical in shape having a flange 31. In a preferred embodiment, the inside diameter is about 3½ inches. The collar is adapted to slide axially on the sleeve between two positions—one a standby position (FIG. 2) in which the collar 30 is supported from its lower rim 32 by a catch arm 33 depending from support 21 and the other an operating position (FIG. 3) in which the collar is supported on the outer wall of the sleeve 20.

At the lower end 22 of the sleeve 20 is an inflatable elastomeric cuff 40. The cuff suitably can be made from a molded rubber sleeve having the cross-section shown in FIG. 1a with one edge 41 secured by a ring clamp 41a to the lower end 22 and the other edge 42 of the cuff similarly secured by a second ring clamp 42a. To accommodate the mounting of the usual size range (sizes 6 to 9) of rubber gloves in which size 6 has a cuff diameter of about 2.07 inches and size 9 about 2.7 inches, the cuff 40 in the relaxed uninflated position (FIG. 2) suitably can have an outside diameter of about 3 inches. For inflating and deflating the cuff 40, a source of air pressure such as a conventional rubber bulb hand pump communicates with the interior 43 of the cuff by way of air pressure line 44. The air line extends at its open end 45 through the side wall at spaced points 46 and 47. Thus, the cuff in combination with the adjacent sleeve wall defines a pressure chamber independent of the sleeve 20. The sleeve, in turn, with its open end 23 sealed by a rubber glove provides the main test chamber.

The invention also contemplates another embodiment shown in FIG. 1b in which the lower end 22 of the sleeve serves for mounting and demounting a rubber glove but is non-inflatable. Instead, the inside wall of the collar 30 is inflatable. The wall forms an inflatable chamber with a molded rubber annular sleeve 50 which has one edge 51 secured by a ring clamp 51a to the lower rim of the collar and the other edge 52 similarly secured by a second ring clamp 52a. For inflating and deflating the chamber, a source of air pressure such as a bulb pump communicates with the interior 53 by way of line 54 having an opening 55 into the interior 53. As shown in FIG. 1b, the sleeve 50 assumes a deflated position (solid outline) and an inflated position (broken outline). In the latter position, the elements in combination provide a leak-proof pneumatic clamp.

In operation, the rubber glove to be tested, as illustrated in FIG. 1, is manually held by its cuff in an inverted position and then mounted onto the deflated cuff 40 manually in the position illustrated in FIG. 2. The cuff 40 when so deflated is relaxed and compliant, being at atmospheric pressure. The collar 30 is then released manually from its standby position and lowered to its operating position (FIG. 3). Air is pumped into the cuff chamber 43 (e.g., to about 5 pounds per square inch/0.34 atmospheres) to cause the cuff to expand to the position shown at FIG. 3. Inflation of the cuff 40 in this manner serves to sealingly clamp the glove into the fixture throughout the testing cycle.

Air is pumped into the sleeve 20 via line 25 to raise the glove pressure (and slightly expand the glove) from atmospheric to about 4 inches of water (0.01 atmospheres) positive air pressure. The line is then bled back for testing purposes precisely to a predetermined pressure [e.g., 3.5 inches of water (0.0087 atmospheres)] in the approximate range from 2 to 4 inches of water (0.005 to 0.01 atmospheres). Measurement of the glove pressure for testing purposes according to the invention can be done in any suitable way. One preferred commercially available apparatus for testing pressure and pressure decay leakage is the type that senses the pressure, records the same in a memory, and then after a pre-set stabilization period, again senses the pressure and compares the two readings for pressure differential. One such preferred apparatus is a USON Leak Tester (supplied by the USON Corporation, Houston, Tex., Model 310 single station, or Model 320 dual station). Characteristically, any glove which has pin holes or overthin walls in the thumb or finger stall areas or in the palm or backside will show decay of pressure. For quality control purposes, the reject level can be set at a predetermined level as desired, for example at $10^{-1}$ cubic centimeters per second decay, so that all gloves meeting or exceeding this decay level are considered rejects. Following the test, the sleeve 20 and cuff 40 are exhausted to atmospheric pressure, the collar 30 is manually lifted to the standby position, and the glove is taken off the fixture as having been either qualified or rejected.

Advantageously, the complete testing cycle is fast by comparison with prior art methods. A preferred cycle of steps is, for example, the following:

| Operation | Time (Seconds) |
|---|---|
| Loading | 3 |
| Cuff Inflation: | ½ |
| Glove Filling: | 1 |
| Glove Pressure Relief and Stabilization: | 3–5 |
| Leak Test: | 2–3 |
| Exhausting: | 1 |
| Cuff Deflation: | ½ |
| Glove Removal: | 1 |
| TOTAL CYCLE | 12–16 |

Figure 5:
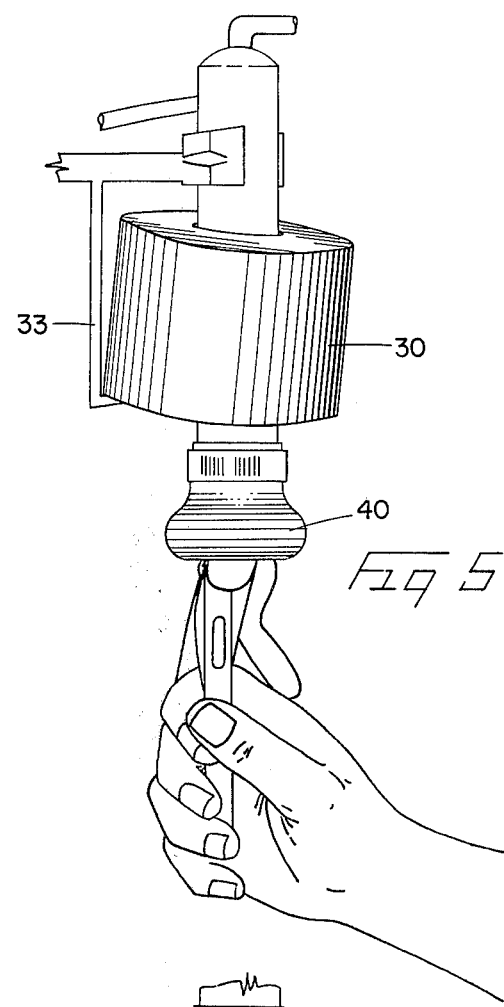
Figure 6:
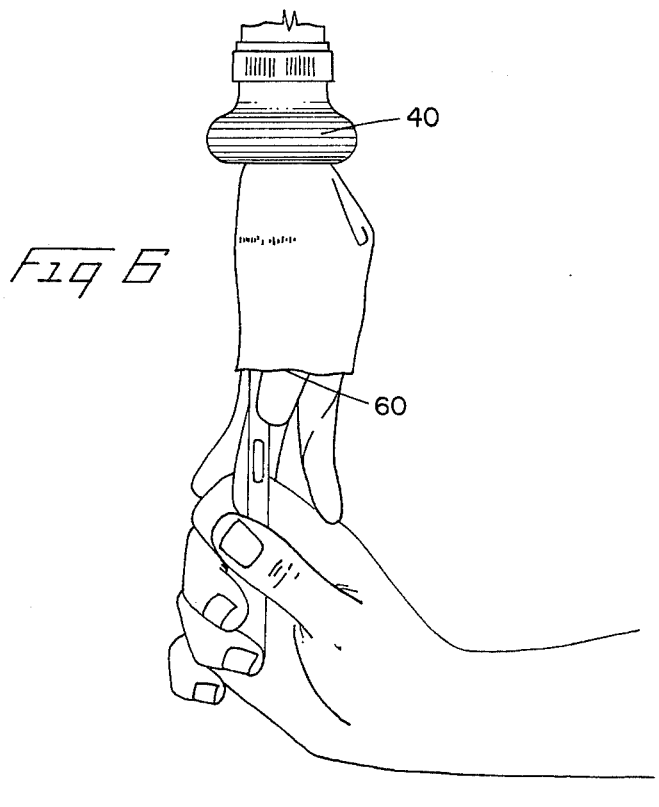
Figure 7:
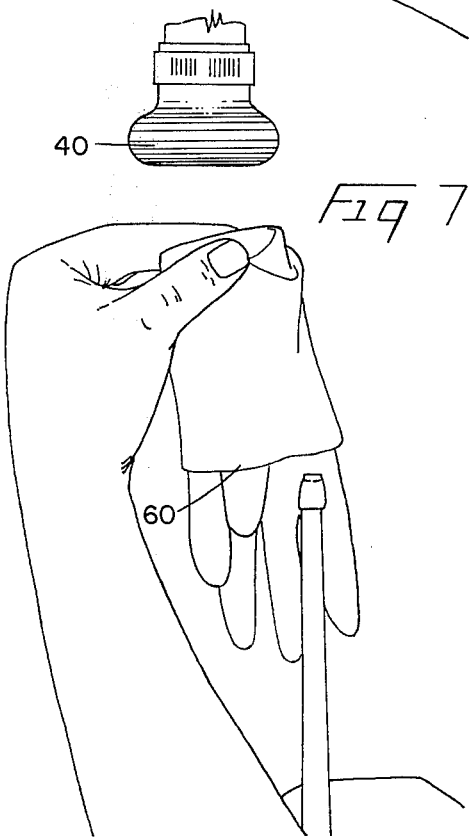

Removal of the glove from the cuff 40 according to one preferred embodiment of the invention advantageously serves to accomplish folding or cuffing of the glove. Cuffing is particularly important for surgeons gloves because of the special professional requirement that such gloves be distributed in sterile wallets with each glove laid out with an open cuff (for convenience in donning) in which the glove end (60, FIG. 7) is located approximately mid-way between the thumb crotch and thumb tip. To accomplish the above preferred method of removal the mid-portion of the glove is grasped, front and back, with rubber-tipped forceps or tongs approximately at the base of the palm (as in FIG. 4) and the glove is raised on the forceps so that it is threaded upward through the sleeve opening 23 and within the interior of the sleeve to a point at which the trailing cuff end 60 of the glove is drawn down and away from the cuff 40. Advantageously, the relaxed, pliable condition of the cuff 40 and the smooth, low friction surfaces of the sleeve interior 26 make for controlled facile release of the glove (FIG. 5). The forceps and glove are then lowered (FIGS. 6 and 7) and the glove picked off in the prescribed folded condition. Removal folding in this manner is not only unexpectedly accurate and reproducible but also prompt requiring, as indicated, only about 1 second.

The work fixture can be fabricated from readily available materials and is economical to make. The component parts should, of course, be durable to withstand repeated use without leakage or other failure. Suitably the sleeve 20 and air lines 25 and 44 can be made of a transparent material such as glass. Preferably the collar 30 is also transparent so that the article being tested is exposed to view during the test. Suitably the collar can be a section of clear plastic tubing such as polyvinylchloride tubing. The cuff material, preferably in molded tubular form and preferably rubber having a chlorinated finish, should be sufficiently thick, (e.g., about 40 mils) to withstand leakage and yet should be resilient for ease in mounting the articles for testing.

While the invention has been described in detail, it will be realized by those skilled in the art that wide variation in such detail can be made without departing from the spirit of the invention as claimed below. It is intended that the claims which follow should be interpreted to cover the invention as described and any such variation.

We claim:

1. Method of folding an article of wearing apparel comprising:
    mounting one end of the article on the cuff of a hollow sleeve fixture so that the article is suspended by gravity from the fixture,
    grasping the article at a point between said end and its lower end,
    raising the article and inserting it into the sleeve fixture for a distance at least sufficient to cause said mounted or trailing end of the article to be demounted from the cuff,
    and withdrawing the article from the sleeve fixture under gravity thereby accomplishing simultaneous removal of the article from the fixture and folding of the article on a fold line coinciding with the point of grasping.

2. Method of folding an elastomeric glove comprising:
    mounting the cuff of the glove on the cuff of a hollow sleeve fixture so that the article is suspended by gravity from the fixture,
    grasping the mid-portion of the glove,
    raising the glove while so held and inserting it into the sleeve fixture for a distance at least sufficient to cause the glove cuff to be pulled loose and demounted from the fixture cuff,
    and withdrawing the glove from the sleeve fixture under gravity thereby accomplishing simultaneous removal of the glove from the fixture and cuffing of the glove on a fold line coinciding with the point of grasping.

3. Method of folding according to claim 2 comprising grasping the front and back of the glove by forceps means at a point approximately even with the base of the palm.

4. Method of folding according to claim 2 comprising grasping the glove at a point such that the folding places the glove end approximately mid-way between the thumb crotch and thumb tip.

* * * * *